US007028851B1

(12) United States Patent
Fenger

(10) Patent No.: US 7,028,851 B1
(45) Date of Patent: Apr. 18, 2006

(54) CARRYING DEVICE FOR BOX-SHAPED ITEMS

(75) Inventor: Jørgen Fenger, Lundby (DK)

(73) Assignee: Joergen Fenger Aps, Glostrup (DK)

( * ) Notice: Subject to any disclaimer, the term of this patent is extended or adjusted under 35 U.S.C. 154(b) by 0 days.

(21) Appl. No.: 09/830,698

(22) PCT Filed: Oct. 28, 1999

(86) PCT No.: PCT/DK99/00587

§ 371 (c)(1),
(2), (4) Date: Aug. 1, 2001

(87) PCT Pub. No.: WO00/27254

PCT Pub. Date: May 18, 2000

(30) Foreign Application Priority Data

Oct. 28, 1998 (DK) .......................... 1998 00404 U

(51) Int. Cl.
A47G 7/00 (2006.01)
(52) U.S. Cl. .................... 211/40; 211/41.12; 211/87.01
(58) Field of Classification Search ................. 211/40, 211/41.12, 94.01, 88.01, 87.01
See application file for complete search history.

(56) References Cited

U.S. PATENT DOCUMENTS

| 2,825,465 | A | * | 3/1958 | Burgo .......................... 211/40 |
| 3,017,999 | A | | 1/1962 | Cano |
| 3,425,568 | A | * | 2/1969 | Albright ...................... 211/169 |
| 3,969,838 | A | * | 7/1976 | Moore ...................... 40/611.06 |
| 4,191,110 | A | * | 3/1980 | Klukos ....................... 108/152 |
| 4,317,603 | A | * | 3/1982 | Pepicelli et al. ....... 206/387.15 |
| 4,427,119 | A | * | 1/1984 | Savino ...................... 211/105.3 |
| 4,505,511 | A | * | 3/1985 | Hanle et al. .................. 296/93 |
| 4,508,301 | A | * | 4/1985 | Nicholson et al. .......... 108/152 |
| 4,573,749 | A | * | 3/1986 | Massaro ....................... 211/40 |
| 4,630,732 | A | | 12/1986 | Snyman |
| 4,648,514 | A | | 3/1987 | Niles |
| 4,651,882 | A | * | 3/1987 | Wright et al. .......... 206/387.15 |
| 4,832,195 | A | * | 5/1989 | Dahl ..................... 206/387.15 |
| 4,867,320 | A | * | 9/1989 | Jonker ........................ 211/189 |
| 4,971,206 | A | * | 11/1990 | Lemmerman et al. ........ 211/40 |
| 5,031,780 | A | * | 7/1991 | Lemmerman et al. ...... 211/135 |
| 5,052,564 | A | * | 10/1991 | Zuzack ........................ 211/40 |
| 5,064,158 | A | * | 11/1991 | Brazier et al. .............. 108/152 |
| 5,072,835 | A | * | 12/1991 | Price, Jr. et al. ........ 206/387.15 |
| 5,105,952 | A | * | 4/1992 | Krattiger ..................... 211/40 |
| 5,148,925 | A | * | 9/1992 | Althoff et al. ................ 211/40 |
| 5,255,802 | A | * | 10/1993 | Krinke et al. ............... 211/184 |

(Continued)

FOREIGN PATENT DOCUMENTS

CH       523 049      7/1972

(Continued)

Primary Examiner—Jennifer E. Novosad
(74) Attorney, Agent, or Firm—Browdy and Neimark, PLLC

(57) ABSTRACT

A carrying device for box-shaped items, such as compact discs in covers, comprises an upper, elongate retaining means with a rubber-elastic portion and a stop for the items, and a lower, elongate carrying means with a horizontal supporting face and a stop for the items. The retaining means has preferably a lip facing the items. The carrying device may below have a shelf, preferably with saw-tooth shaped steps. The retaining means and the carrying means are preferably connected by a wall. The carrying device has preferably suspension means for suspension on a wall, and preferably supporting means for support against the wall. The supporting means are preferably lengthwise adjustable by shortening. The carrying device has preferably feet for resting on a tabletop, and its supporting structure is preferably constituted by an extruded metal blank.

28 Claims, 9 Drawing Sheets

U.S. PATENT DOCUMENTS

| | | | | |
|---|---|---|---|---|
| 5,292,010 | A | * | 3/1994 | Pickles et al. ............ 211/41.12 |
| 5,346,078 | A | * | 9/1994 | Ernetoft ........................ 211/40 |
| 5,458,307 | A | * | 10/1995 | Gebka ...................... 248/205.3 |
| 5,474,190 | A | | 12/1995 | Won-Kim |
| 5,495,953 | A | * | 3/1996 | Bearth .......................... 211/40 |
| 5,572,822 | A | * | 11/1996 | Lynch et al. ................... 40/308 |
| 5,667,083 | A | * | 9/1997 | Schnoor et al. ........... 211/41.12 |
| 6,193,336 | B1 | * | 2/2001 | Jencka ....................... 312/9.57 |

FOREIGN PATENT DOCUMENTS

| | | |
|---|---|---|
| DE | 1 429553 | 11/1968 |
| DE | 35 00 870 A1 | 7/1986 |
| DK | MA 0053 1990 | 1/1990 |
| DK | 166121 B | 3/1993 |
| EP | 0 164 815 A2 | 12/1985 |
| EP | 0 368 075 A2 | 5/1990 |
| GB | 2 182 842 A | 5/1987 |
| GB | 2 209 273 A | 5/1989 |
| SE | 9402031-0 | 12/1995 |
| WO | WO 88/07344 A1 | 10/1988 |
| WO | WO 95/2022 A1 | 7/1995 |
| WO | WO 98/54688 A1 | 12/1998 |

\* cited by examiner

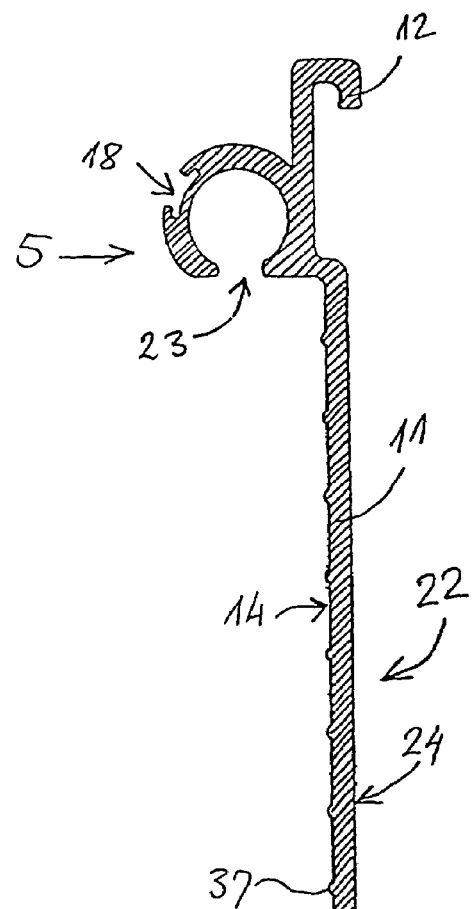
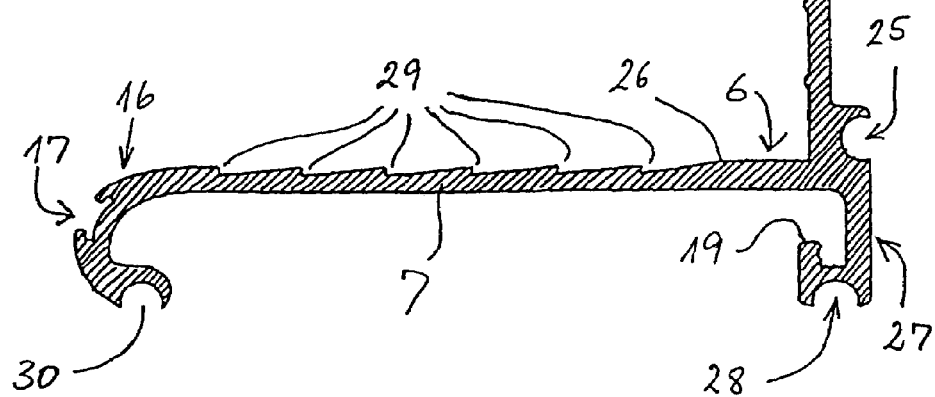
Fig. 3

CARRYING DEVICE FOR BOX-SHAPED ITEMS

REFERENCE TO RELATED APPLICATIONS

The present application is the national stage under 35 U.S.C. 371 of international application PCT/DK99/00587, filed 28 Oct. 1999 which designated the United States, and which international application was published under PCT Article 21 (2) in the English language.

BACKGROUND OF THE INVENTION

1. Technical Field of the Invention

The present invention relates to a carrying device for a number of flat, box-shaped items, such as cassettes, tiles, covers or the like. The items are typically tall, broad and thin. The invention is in particular appropriate for storage and display of compact discs in covers mutually arranged in the same way as books in bookshelves.

2. Prior Art

Compact discs are mostly used for storage of digital musical recordings and computer programs. Carrying devices for compact discs in covers are generally known in exceedingly many variants. They also exist for digital video discs and MiniDisc-records (compact discs in a small size). All these types of records are generally stored in plastic covers (cassettes) of quite the same structure. The covers have retaining means for the record or records and inner retaining means for insertion labels or folders.

For the sake of simplicity, all these three types of records in their covers are below designated "CDs", and the expressions "CD, the CD, CDs and the CDs" are to be understood as any of the above stated kinds of items.

A carrying device of the stated kind designed by the designer group TOOLS and produced and marketed by the company Tommy Larsen, Silkeborg, Denmark, has the form of an extruded (and thus prismatic) item which in a horizontal direction is elongate and has an almost C-shaped cross section. The two terminal points of the C-shaped cross section hereby form rectilinear, horizontally extending jaws provided with rubber edges facing each other. The item is intended to be fastened on a wall with the two jaws turning away from the wall and facing the room.

The distance between the two jaws is thus adapted that a CD just fits tightly in between the rubber edges of the jaws, when set on edge with its back facing the room. The bottom jaw projects somewhat longer out in the room than the top jaw, whereby the CD is retained in a secure way even though it is loaded downwards by the gravitational force or possible impacts.

However, this carrying device has the drawback that the CD is retained relatively tightly between the jaws. This makes it unnecessarily difficult to insert and remove CDs, and as their exterior (the cover itself) is produced from a rather fragile type of plastic, they break easily when inserted in or removed from the known carrying device.

A further inconvenience of the known carrying device is that the CD does not have a well-defined orientation in the rotating direction around a horizontal axis parallel to the wall on which the carrying device is arranged. No well-defined stops being provided for the rear edge of the CD and at the same time, the CD moves stiffly at insertion, it is difficult for the users to reach a well-defined position for each individual CD, and as consequence, they are not aligned with each other when they are placed in the carrying device.

Finally, it is a disadvantage of the known carrying device that when removing the CD from the carrying device, the CD can only be seized by the two corners facing the room.

Another carrying device of the initially stated kind and designed by Frank Nielsen is known from a catalogue "Living Design—Music is the Dream Language of the World" from the company LIVING DESIGN of AM Denmark A/S, Kokkedal, Denmark (page 23).

This carrying device consists of an extruded rail mounted horizontally on a wall or the like. The rail has near its top edge two narrowly spaced, elongate horizontal jaws of which the top jaw is drawn backwards against the wall and the bottom jaw projects into the room.

Between these two jaws, an inner end of an arm or cantilever can be arranged and in its rest position project horizontally into the room and furthermore swing in a horizontal plane and thus be left in any desired angle with the wall, in the horizontal plane.

The CDs are arranged each hanging down from one of these arms by hooks on the underside of the arm being engaged with recesses provided on the upper edge of cover of the CD in connection with the retaining means for the insertion labels or folder.

Thus, the CDs may swing sideways forwards and backwards in the way a reader may "leaf" through a book. It is easy to watch the fronts of the CDs in order to choose one to be played or entered into a computer.

The CDs with attached arms may probably be detached from the wall rail when they are to be played. If the CDs are transported, it is, however, usually necessary to demount the arms.

It is a drawback of this carrying device that the CDs are not particularly close in the sideways direction. It is obviously necessary with a considerably mutual horizontal distance between the CDs for them to be able to swing sufficiently widely. The carrying device has thus a considerably reduced storage capacity per occupied cubic unit in relation to carrying devices where the CDs are stored closely.

Furthermore, it is a considerable inconvenience of this carrying device that the hooks of the arms are fragile because of their required cooperation with the standard recesses in the CD, and that the covers of the CDs as stated are produced from a very fragile material.

OBJECT AND SUMMARY OF THE INVENTION

The object of the invention is to provide a carrying device of the initially stated kind which is free from the described disadvantages of the known carrying devices but which still permits a close storage of the CDs and permits to leaf through the CDs as in a book.

According to the invention, this object is achieved in that the carrying means has a relatively smooth and plane, essentially horizontal, upper supporting face, and adjacent to and behind the supporting face a stop for the items, elongate in the crosswise direction, and that the retaining means on its underside has a rubber-elastic portion, and a stop for the items, placed behind this portion and elongate in the crosswise direction.

The plane and smooth supporting face permits the CDs to swing around an essentially vertical axis even though their weight essentially rests on the supporting face. Furthermore, the insertion and removal is essentially facilitated as the lower, inner corner of the CD may slide in place even after the rubber-elastic portion of the retaining means has obtained a braking engagement with the upper inner corner of the CD.

The stop of the supporting means behind the supporting face permits a secure fastening of the CD in its inserted position. As the CD is mainly retained by its two inner corners (which are in front in the insertion direction), the gravity will make it swing around a horizontal axis in the crosswise direction of the carrying device; this corresponds to an inward force acting at the lower stop adjacent to the supporting device, and this force is absorbed by the stop. At the same time it is assured that all the CDs are aligned to each other, whereby a favourable visual impression is obtained.

In preferred embodiments, the supporting means and the retaining means extend relatively shortly from the front of the carrying device, in particular preferably about 10 and 5 mm, respectively. Preferably 5–15 mm and particularly preferred about 10 mm.

Thus, the said leafing in the CDs is facilitated, as the axis of rotation in the swinging leafing movement will be correspondingly close to the rear edge of the CD. This provides the user with an extremely convenient access to watch the fronts of the CDs where the most relevant and most easily recognisable information is most frequently placed.

It is preferred that the rubber-elastic portion of the retaining means comprises an edge or lip facing the items and that the lip then points in the direction towards the stop of the retaining means, i.e. towards the front of the carrying device.

By an edge or lip engaging the upper edge of the CD, a reduced insertion force and a better retaining are obtained due to the resiliency of the edge or lip. This resiliency gives per se a lesser resistance when inserting the CD in the carrying device. During the fastening in the carrying device, the resiliency of the edge or lip means that the rubber-elastic edge abutting against the upper edge of CD is deformed instead of slipping when the CD is subjected to stress for removal. The rubber edge thus maintains a better "grip" in the upper edge of CD.

In a particularly preferred embodiment, the lip is directed towards the stop of the carrying device. Thus, the lip has a barb effect retaining the CD even better.

Besides, tests have shown that such an inward lip surprisingly improves its grip in the upper edge of the CD each time the CD swings forwards and backwards in the leafing movement. This is presumably because the lip has two independent grips in the two side corner edges of the upper edges which both have a small, upwards directed bead. In this way the grip of lip in the bead which is mowing outwards in the swing movement can force the opposite bead further inwards under the lip as a consequence of the swing movement. Thus, it is in a very effective way prevented that the swing movement loosens the CDs from the carrying device when leafing through the CDs.

It is a further object of the invention to provide a display and/or disposal place for the CDs so that the carrying device may be used for display of CDs at the dealers, in libraries or the like, and be used for disposal of the cover while the CD is played or entered.

According to the invention, this object is obtained in that the carrying device is provided with a shelf below on the front of the carrying device. The CD can thus be placed on the shelf, leaning against the front.

In a preferred embodiment, the shelf has steps or beads extending in its crosswise direction. These are preferably saw-tooth shaped with a low, steep or essentially vertical edge facing the stop of the carrying means.

It is thus obtained that a CD placed on the shelf and leaning against the front of the carrying device cannot slip on the shelf and thus fall down.

It is preferred that the supporting face is placed higher than the shelf. The CDs are thus prevented from touching the shelf during the swing movement which would tend towards shifting their axis of rotation outwards, away from the front of the carrying device. In this connection it is preferred that the peaks of the serration are placed in a horizontal plane situated 0.2–1 mm, preferably about 0.5 mm below the plane of the supporting face.

It is preferred that the retaining means and carrying means are connected to an essentially vertical wall which preferably constitutes the two stops. This results in a simple and thus less expensive structure of the carrying device.

The retaining means and/or carrying means can on their fronts have holders such as open canals to hold signs, labels or the like.

It is thus obtained that e.g. an alphabetical grouping of the CDs does not occupy sideways place between the CDs. These may thus be arranged sideways close and still be grouped in a systematic way.

According to the invention, the carrying device preferably has suspension means which can engage with fittings to be fastened on a wall.

A further object of the invention is to permit the carrying device to be suspended very precisely plumb in a simple way.

According to the invention, this object is achieved in that the carrying device below on the rear side has supporting means for support against a wall on which the carrying device is suspended, which supporting means are adjustable lengthwise.

Preferably, the supporting means have the form of pieces from an extruded rubber item which have longitudinal weakenings in the crosswise direction to permit a crosscutting of the supporting means, if desired, the weakenings permitting a shortening of the rubber blank.

Finally, it is an object of the invention to permit a number of carrying devices to be suspended in an as simple way as one carrying device and in a secure way.

According to invention this object is obtained in that the carrying device has catching means to carry a below arranged carrying device of the same kind, preferably in cooperation with its suspensions means.

In a preferred embodiment, the catching means and suspension means on two interconnected carrying devices are meant to be locked together, preferably in that a stiff wire is inserted in a channel constituted by recesses in both catch and suspension means.

In that the carrying device is designed as being elongate in the crosswise direction with an essentially constant cross section, its supporting structure preferably being constituted by an extruded, elongate metal blank, an extremely simple, rational and low-cost production of the carrying device is obtained along with a pleasant appearance

BRIEF DESCRIPTION OF THE DRAWINGS

In the following, the invention will be explained in more detail by means of examples of embodiment and with reference to the drawings, in which FIG. 3 shows a cross section in an extruded metal lank for production of the carrying device in FIG. 1.

Identical reference numbers are used for corresponding parts in all figures.

DETAILED DESCRIPTION OF THE PREFERRED EMBODIMENT(S) OF THE INVENTION

Figure 1:
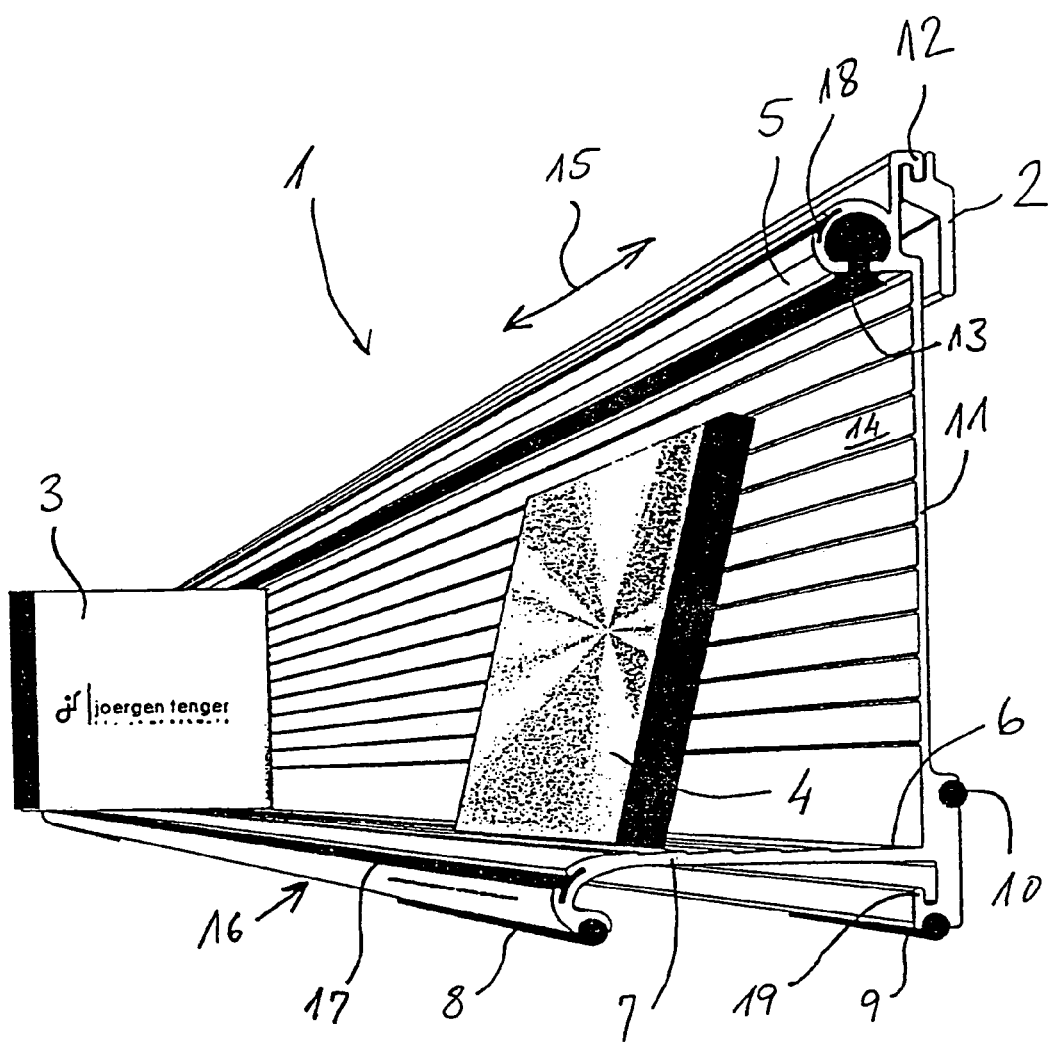
FIG. 1 shows a carrying device according to the invention, suspended on a wall fixture on a wall.

FIG. 1 shows a carrying device 1 according to the invention. The carrying device 1 has a body or a wall 11 forming a supporting chassis. In FIG. 1, the front 14 of the chassis 11 is visible. The carrying device 1 is elongate in its crosswise direction 15.

At the top of the chassis 11, there is provided a retaining means 5 in the form of a downwards open tube projecting forward and partly enveloping a rubber profile with a lip 13 projecting downwards and backwards.

On its front, the retaining means 5 has an undercut groove 18 in which a black ornamental strip of plastic is embedded, as shown in the embodiment in FIG. 1.

A little further up on the back of the chassis 11, an elongate hooked suspension means 12 is provided to engage with a wall fixture 2 fastened to a wall (not shown) in a room.

A carrying means in the form of a forward projecting slat 6 is provided below on the chassis 11. The slat 6 continues in a shelf 7 which curves downward in front at 16. The curve 16 of the shelf is terminated in a foot 8 which in the shown embodiment consists of an O-ring string embedded in a recess in the curved portion 16 of the shelf 7.

In front of the curved portion 16, a groove 17 corresponding to the groove 18 is also here provided with an ornamental strip.

The chassis 11 continues downwards to a similar foot 9 which is provided in the same way as the foot 8. Below on the back of the chassis 11, a similar embedded O-ring string 10 acts as a support means against the wall on which the carrying device is suspended.

In the carrying device 1, a CD 3 is pushed in between the retaining means 5 and the carrying means 6. The CD is suspended by its own weight without touching the shelf 7, and retained by the deformation in the rubber lip 13.

On the shelf 7, a CD 4 leans against the front 14 of the chassis 11 with its face side facing forwards for display.

Figure 2:
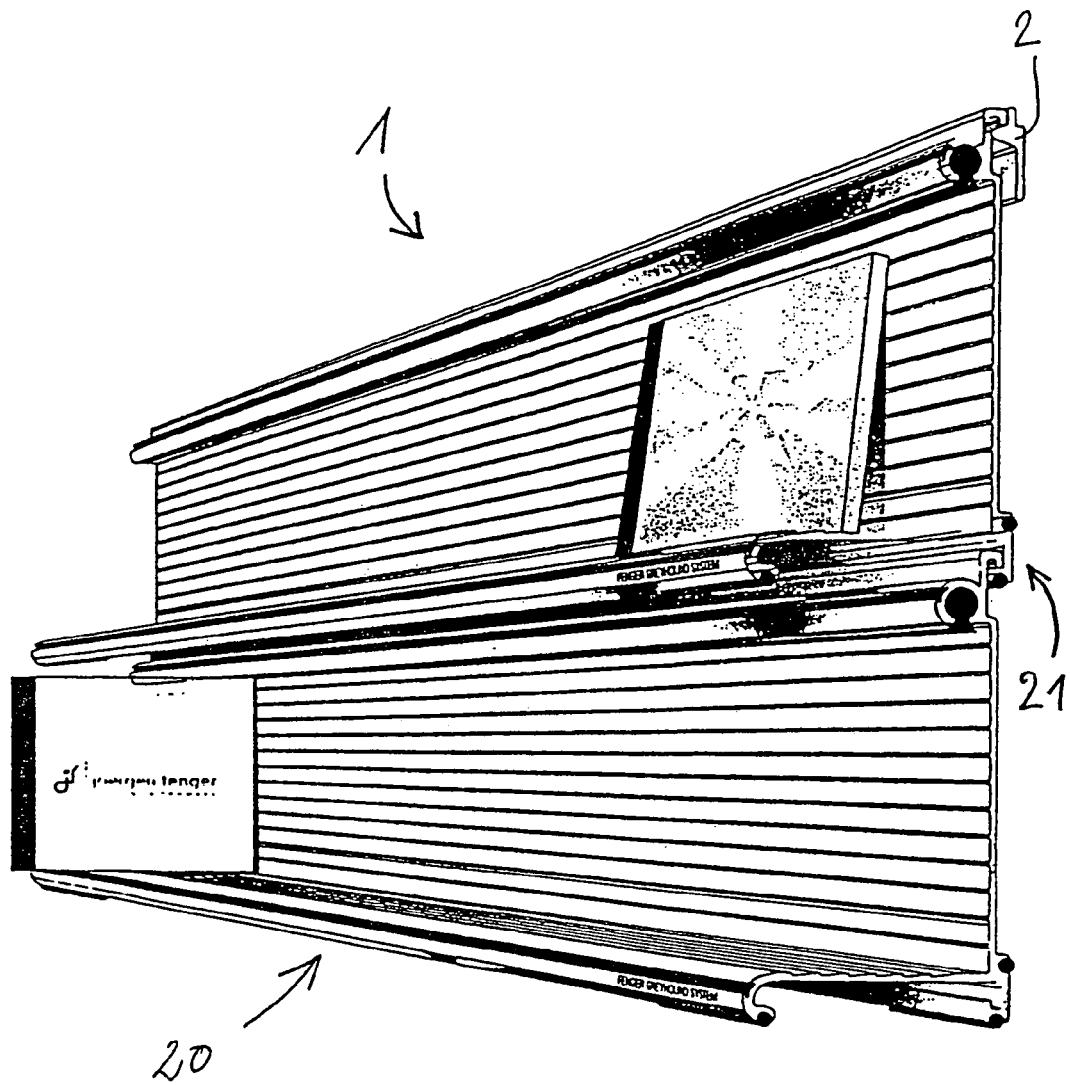
FIG. 2 shows two joined carrying devices according to the invention, suspended on a wall fixture on a all.

FIG. 2 shows two carrying devices 1, 20 of the same kind as in FIG. 1. The upper carrying device 1 is suspended on the wall fixture 2 as in FIG. 1, whereas the suspension means 12 of the lower carrying device 20 (cf. FIG. 1) at 21 engages with a catching means 19 on the upper carrying device 1 at the bottom of the front 14 of the chassis 11 (cf. FIG. 1)

FIG. 3 shows a cross section of an elongate extruded metal blank 22 for production of the carrying devices in FIGS. 1–2. Starting from the top, the following elements are shown in the cross section:

The hooked suspension means 12; the tubular retaining means 5 with the undercut groove 18 and an opening 23 to receive a rubber profile; the wall-shaped chassis 11 with the front 14 and a back 24; a number of beads 37 on the front 14 of the chassis 11 (cf. below); a slightly undercut, circular groove 25 to receive the supporting means 10; the carrying means 6 extending from the front 14 of the chassis 11 to a faint break 26 on the top side of the shelf; the lower extension 27 of the chassis 11 with a groove 28 corresponding to the groove 25 and to receive the foot 9; the shelf 7 which on its top side has a number (here: six) of saw-tooth shaped steps 29 for securing inclining CDs 4 (FIG. 1); the curved portion 16 of the shelf 7 with the undercut groove 17 and a groove 30, corresponding to the grooves 25, 28 and for receiving the foot 8.

The beads 37 have only ornamental purposes; they break the surface of the front 14 in a visually pleasant way and at the same time, they will quite effectively mask the unwanted, so-called drawing lines which almost always appear on extruded metal blanks.

Figure 4:
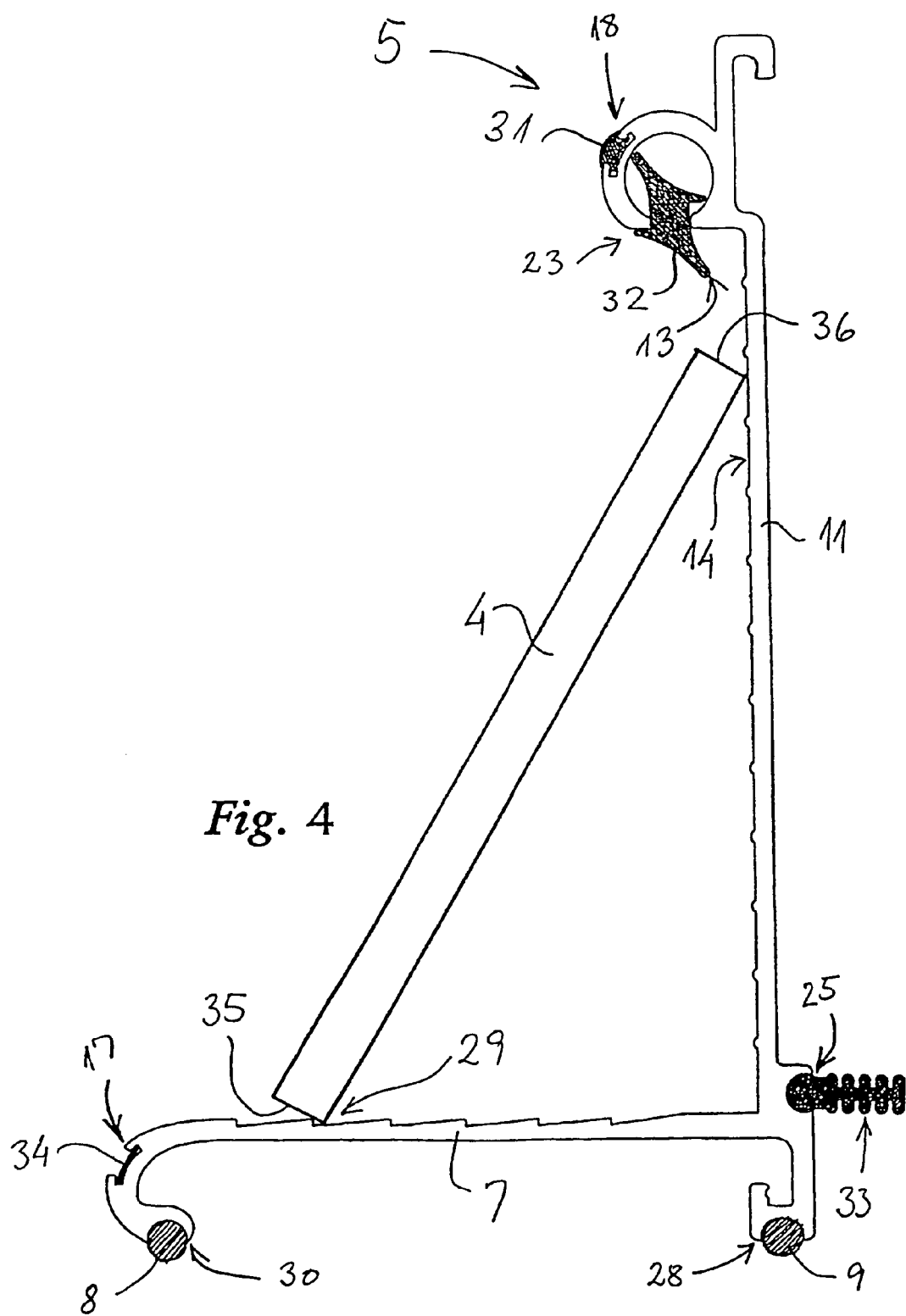
FIG. 4 shows the carrying device in FIG. 1, seen from the side, with a CD placed in an inclined position.
Figure 5:
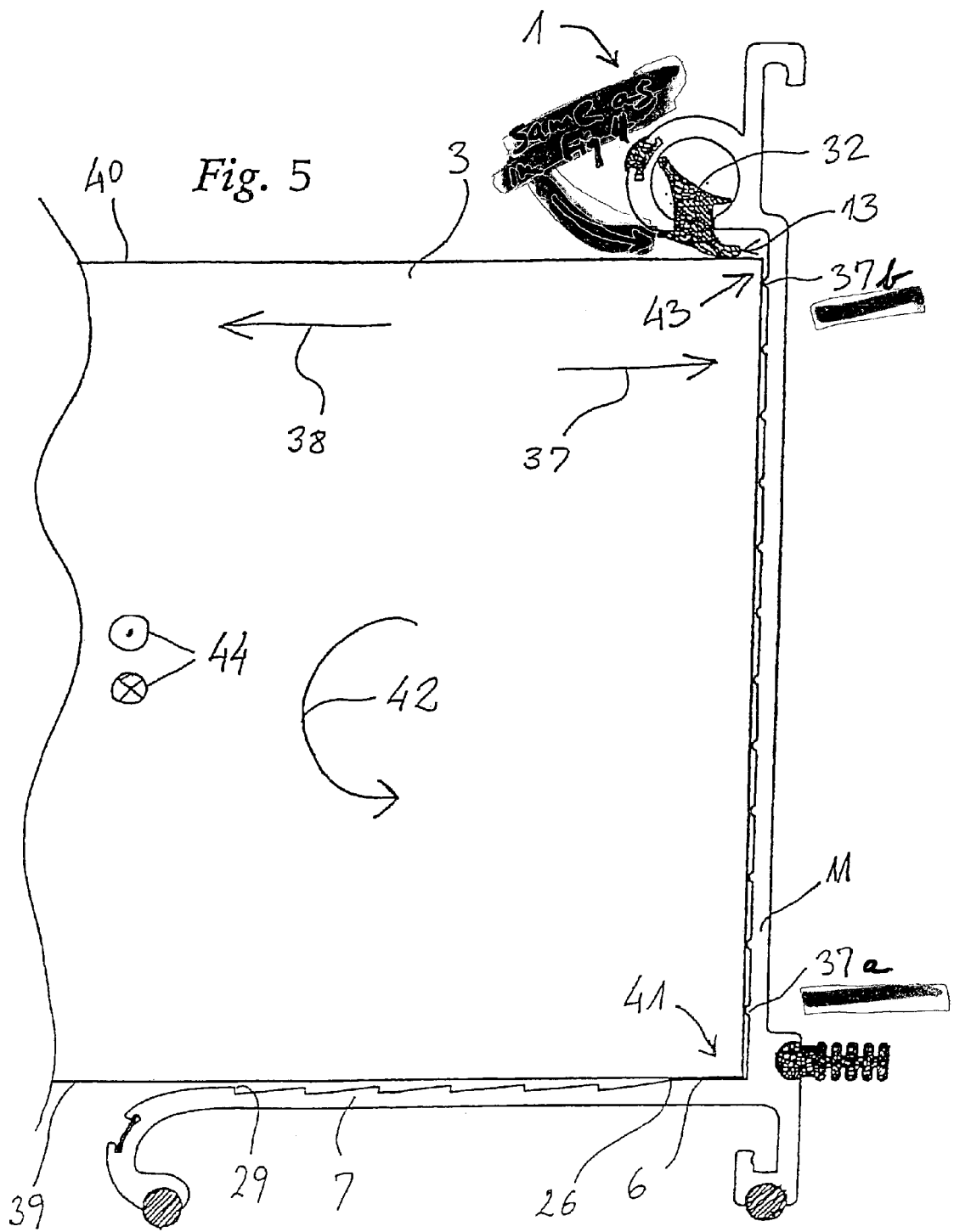
FIG. 5 shows the carrying device in FIG. 4 with a CD placed in the device.

In FIG. 5, the carrying device 1, 20 is seen from the side. According to the invention, FIG. 4 shows the different rubber and plastic parts belonging to the carrying device.

A plastic profile 31 is placed in the groove 18 (cf. FIG. 4). This profile 31 may e.g. be used as a decoration in the entire extent of the carrying device in the crosswise direction 15 (FIG. 1) or it may be delivered with the carrying device 1, 20 cut in short pieces with applied letters of numbers for division of the carrying device into portions for alphabetical or numerical grouping of the CDs 3 in the carrying device 1, 20.

In the opening 23 in the retaining means 5, an elongate rubber profile 32 is inserted (cf. FIG. 6), extending in the entire width of the carrying device in the crosswise direction 15 (FIG. 1). The profile 32 has a lip 13 facing backwards—i.e. towards the chassis 11—the function of which will be explained below.

A supporting means is inserted in the groove 25 in an alternative embodiment 33 (instead of the embodiment 10 in FIG. 1 which is an O-ring string). The function of the supporting means in the embodiment 33 will be explained below.

In the grooves 28 and 30, there are inserted feet 9 and 8 in the form of pieces of an O-ring string, as shown in FIGS. 1–2.

In the groove 17, a plastic ribbon 34 is inserted for decoration purposes as shown in FIG. 4.

As shown in FIG. 1, a CD 4 is placed on the shelf 7. The CD 4 rests with its lower edge 35 on the top side of the shelf, said edge engaging one of the saw-tooth shaped steps 29. The upper edge 36 of the CD 4 leans against the front 14 of the chassis 11.

As appears from FIG. 4, the steps 29 will catch the lower edge 35 of the CD 4, when the CD is placed on the shelf 7. Tests have shown that this prevents in a surprisingly effective way the CD from slipping on the shelf 7 and thus from falling down, also when the CD is placed in a hurry or in a careless manner.

FIG. 5 illustrates the main function of the carrying device, i.e. to store the CDs closely as books in a bookcase.

A CD 3 is inserted in the carrying device 1 in the direction of insertion 37. The rubber lip 13 on the rubber profile 32 is thus deformed as appears from FIG. 5. Consequently, the lip 13 exerts a downward pressure on the upper edge 40 of the CD. This downward pressure will increase if the CD moves in the direction of removal 38, and reduce when the CD moves in the direction of insertion 37. This results from easily understandable geometrical facts. The lip 13 acts thus as a barb and because of its material properties, it has a high friction against the upper edge 40 of the CD.

The lower edge 39 of the CD rests with its bottom corner 41 against the carrying means 6 which as earlier stated only extends until the edge 26. The friction between the corner 41 of the CD and the carrying means is quite small as the materials will typically be hard plastic and anodised aluminium which as known has an extremely small-mutual friction.

The gravity will try to turn the CD in the rotating direction 42 as the CD is only carried in its corners 41 and 43. However, since the CD 3 is retained with considerable friction in the corner 43 by the rubber lip 13, it is pressed inwardly towards the chassis 11 at the bottom. The corner 41 is thus stopped by the chassis 11—or in the shown embodiment rather by the lower bead 37—which then acts as a stop placed immediately adjacent to the carrying means 6. The corner 41 is thus fixed in a well-defined spot.

In the same way, the top corner 43 of the CD 3 is directed towards a stop when inserted, which stop is constituted by the chassis 11 or rather the upper bead 37. Also the top corner 43 is then fixed on a well-defined spot.

Consequently, the placement of the CD 3 in the carrying device 1 is very well-defined and therefore all the CDs in the carrying device will be aligned neatly; they will lined up exactly and give a pleasant and proper impression.

When the CD swings sideways as a leaf in a book, i.e. that the front part of the CD (the portion farthest away from the chassis 11) is moved in the side direction 44 (FIG. 5), the upper edge 40 will rub against the lip 13. However, this edge has a considerable width, as appears from FIG. 4 (the edge 36), and thus, the one side (corner edge) of the edge 40 will move a little outwards in the direction 38, and the other side (corner edge) of the edge 40 will move a little inwards, in the direction 37.

Tests have surprisingly shown that the earlier stated barb effect by these movements is actually able to pull the CD further and further inwards towards the chassis 11, even though the CD at the swing movements (44) should be drawn a little outwards in the direction 38. The lip thus has the effect that it prevents in an extremely efficient way the CDs in the carrying device 1 from falling out when being leafed through even if this is done more or less violently.

On the other hand, the resilience in the lip 13 enables the CD to be moved easily sideways in the crosswise direction 15 (FIG. 1) when other CDs are to be inserted in the succession or otherwise rearranged.

The said barb effect of the lip 13 does not impede an easy removal of the CDs, as they can merely be swung in the opposite rotating direction of the direction 42, whereby the bottom corner can without difficulty be withdrawn from the carrying means 6 because of the mentioned low friction.

Figure 6:
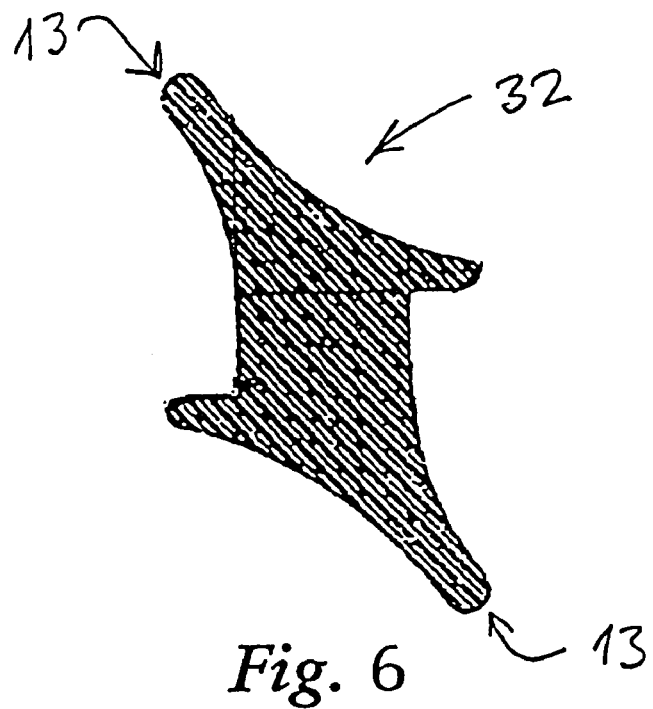
FIG. 6 at an enlarged scale shows a rubber profile for the retaining means in the carrying device in FIGS. 4–5, FIG. 7 at an enlarged scale shows a rubber profile for edging in the carrying device in FIGS. 4–5, FIG. 8 at an enlarged scale shows a rubber profile for a supporting means for the carrying device in FIGS. 4–5.

FIG. 6 shows the rubber profile 32 on a larger scale. In the shown embodiment, the profile is reversible, with two lips 13 so that it may be turned if one lip is worn.

Figure 7:
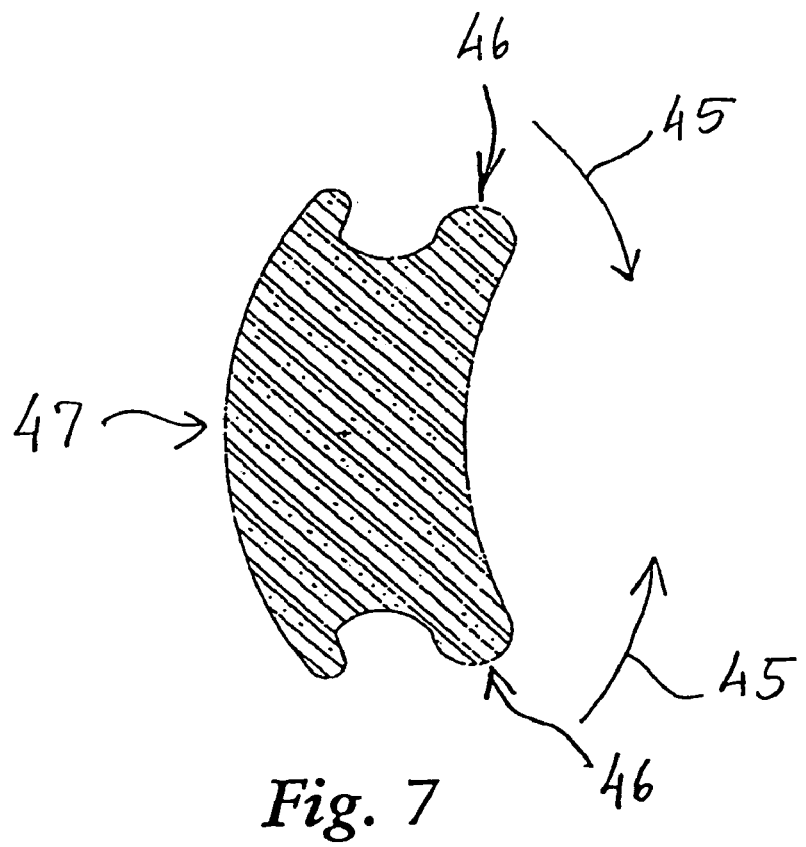

FIG. 7 shows the plastic profile 31. It is formed of such an elastic material that it can easily be compressed in the directions 45, when its two lips 46 are inserted in the undercuts in the groove 18 (or the groove 17). On the front 47, letters, numbers or other information can be printed.

Figure 8:
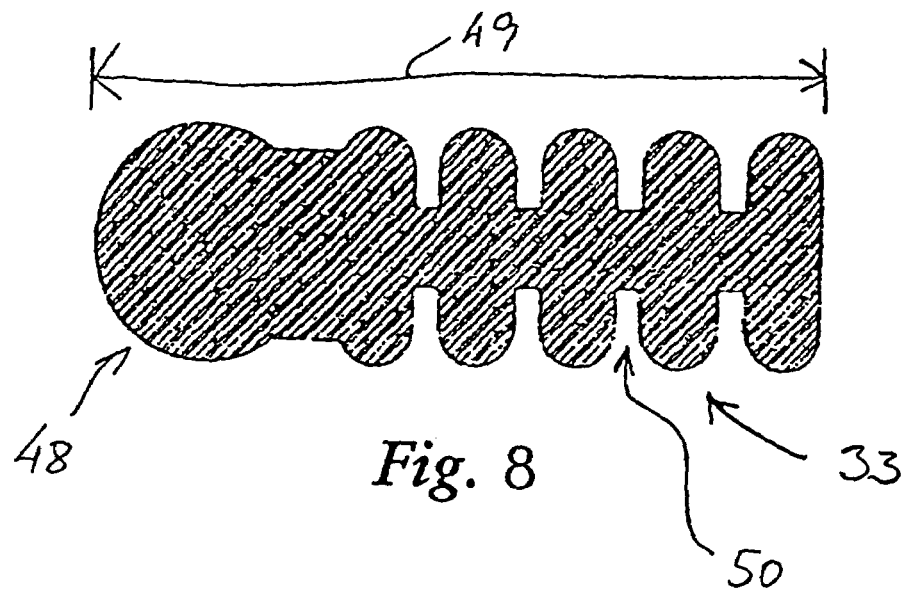

FIG. 8 shows the cross section of the supporting means 33. This has a circular bead 48 fitting into the groove 25. The dimension 49 of the support means can easily be modified without tools by tearing the means in one of the grooves 50, the groove thereby facilitating the tear. The distance of the lower parts of the chassis 11 from the wall of the room can thus be adjusted such that a carrying device can be suspended exactly in plumb, also on an uneven wall.

Figure 9:
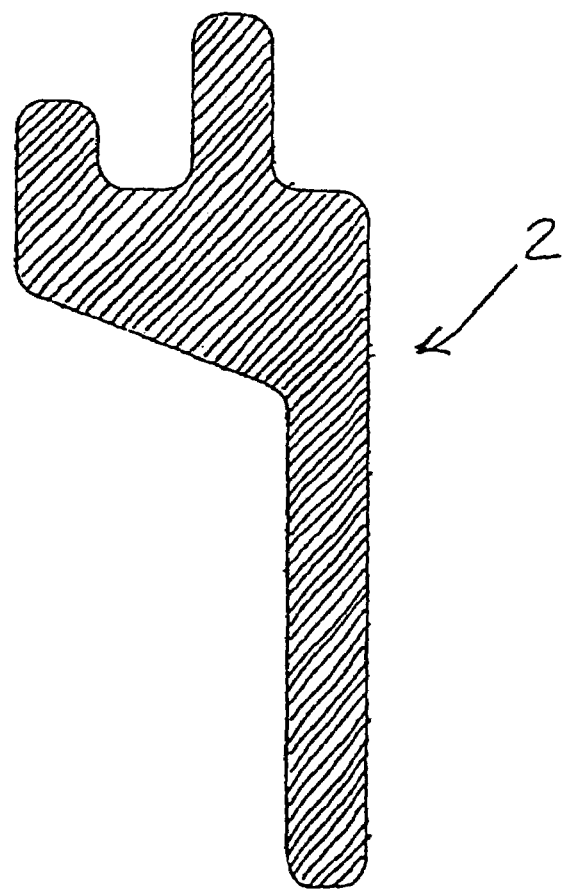
FIG. 9 at an enlarged scale shows a cross section in the wall fixture in FIG. 1, FIG. 10 at an enlarged scale shows a detail drawing of the suspension of the carrying device in FIG. 1 on a wall fixture, and FIG. 11 at an enlarged scale shows the interconnection of the two carrying devices in FIG. 2.
Figure 10:
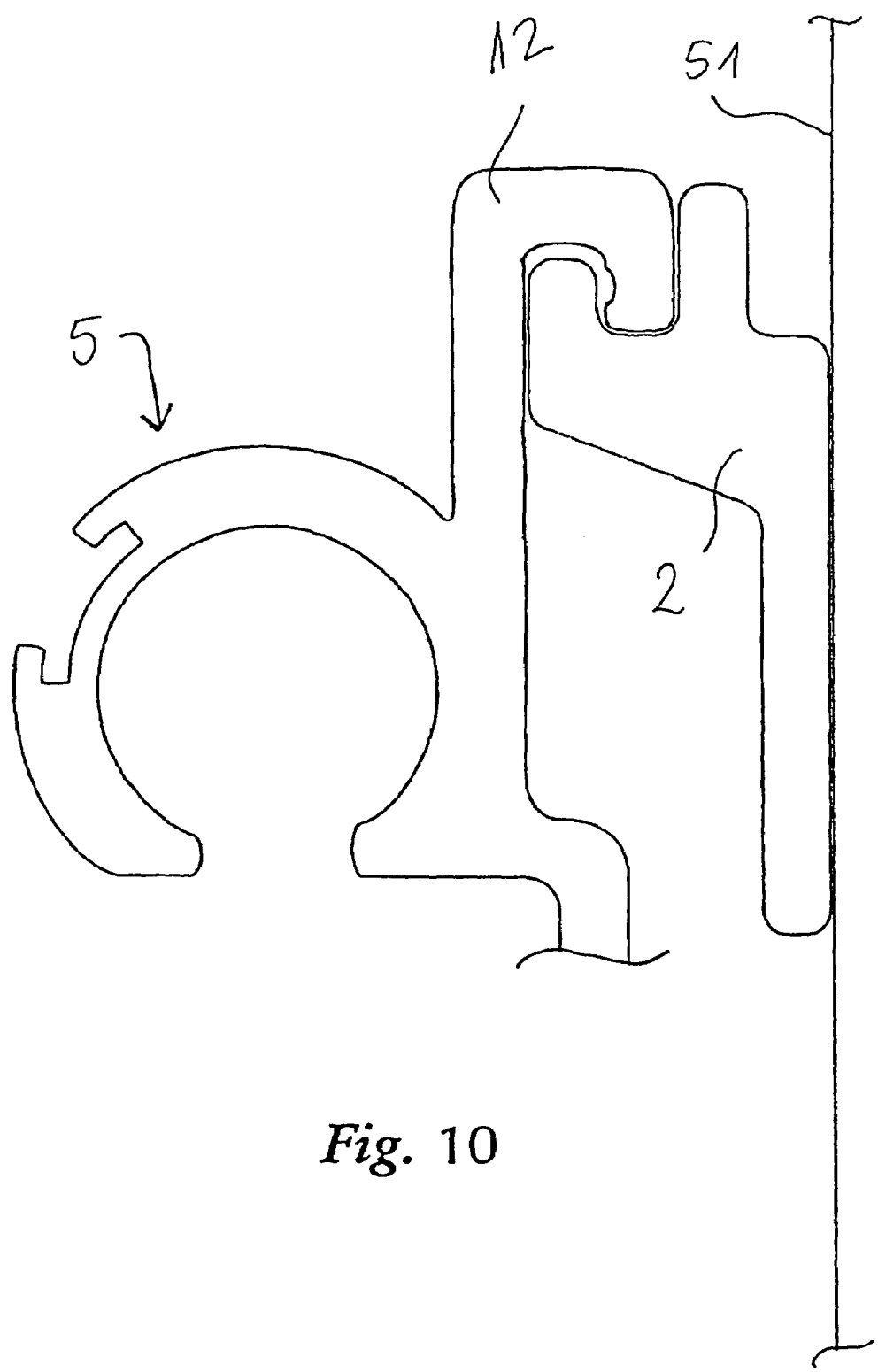

FIG. 9 shows the cross section of the wall fixture 2. In FIG. 10 is shown how the wall fixture 2 cooperates with the suspension means 12 when the carrying device is suspended on a wall 51.

Figure 11:
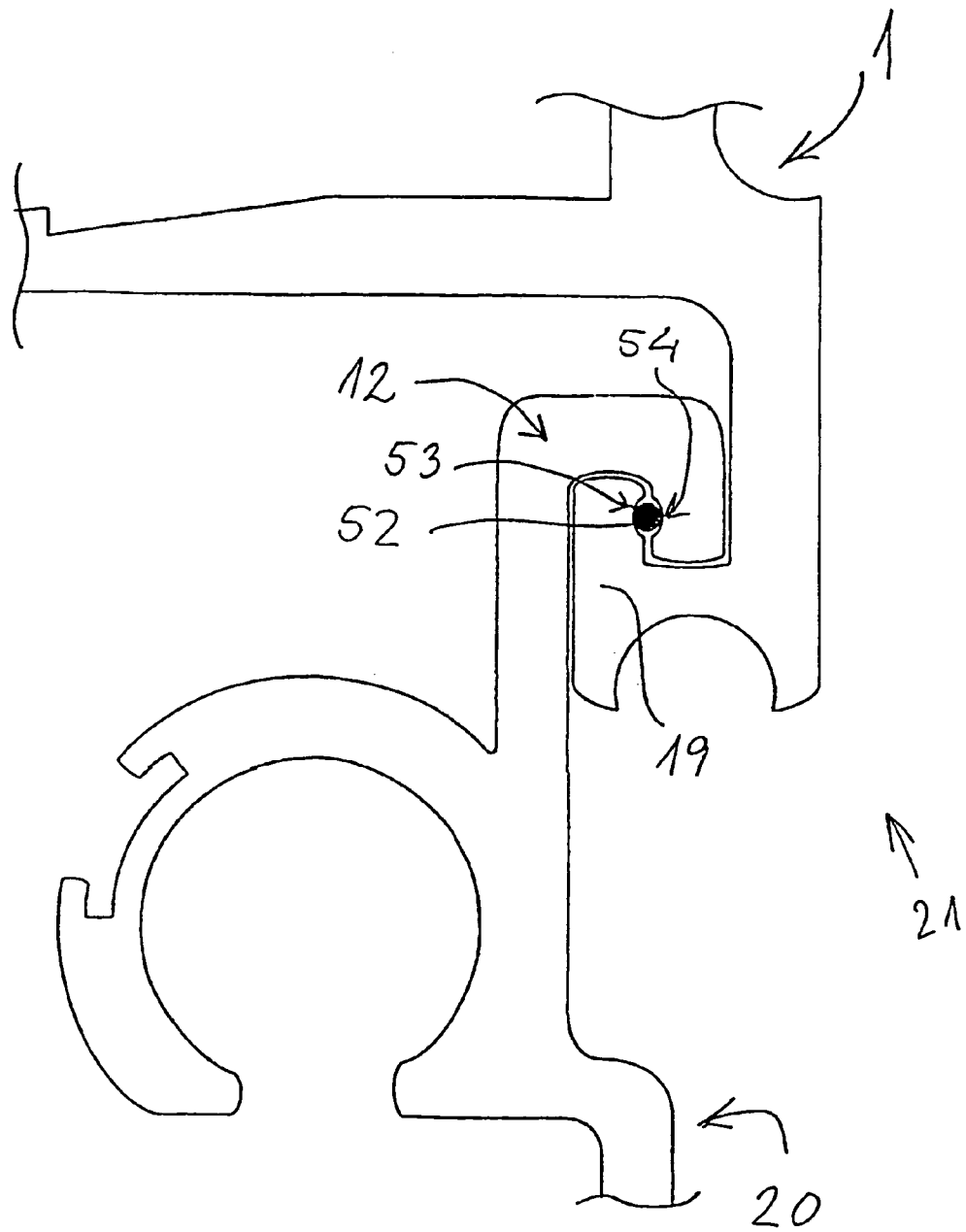

Finally, FIG. 11 shows how the catching means 19 on the upper carrying device 1 in FIG. 2 cooperates with the suspension means 12 on the lower carrying device 20 in FIG. 2.

According to the invention, the catching means 19 is provided with a groove 53, and the suspension means 12 with a groove 54 such that a locking wire 52 may be inserted in the cavity elongate in the crosswise direction and defined by these two grooves. The two carrying devices are thus locked to each other very effectively such that the lower carrying device 20 is prevented from slipping and falling down.

Even though the description only mentions the use of the carrying device according to the invention for storage and display of CDs, there is nothing to prevent the invention from being used for other objects of the same flat box-shaped form. The only requirement is that the objects are equally large in one of their two largest dimensions, typically the height.

Such other objects can e.g. be packed goods in flat boxes, books or booklets tightly wrapped in plastic foil. The use for solid objects which are to be removed and put in place frequently such as serving trays is also possible.

The invention claimed is:

1. A carrying device (1) for flat, box-shaped items (3), with the largest faces of these items (3) arranged in vertical planes, which carrying device (1) has a front for receiving the items (3), and a back, and comprises an upper retaining means (5) elongate in a crosswise direction (15) and a lower carrying means (6) elongate in the crosswise direction (15), placed under the upper retaining means (5) and extending in parallel and rigidly connected to the upper retaining means (5), said lower carrying means (6) having a substantially smooth and planar, essentially horizontal upper supporting surface; a first stop (11, 14, 37a) for the items (3) being placed adjacent to and behind an upper supporting surface of the carrying means and being elongate in the crosswise direction (15); and said retaining means (5) having on an underside thereof a rubber-elastic portion (32); a second stop (11, 14, 37b) for the items (3) being placed behind the rubber-elastic portion (32) of the retaining means and being elongate in the crosswise direction (15), said rubber-elastic portion (32) having a wedge shaped lip (13), with an edge projecting downward substantially towards the lower carrying means (6) thus facing towards and adapted to be engaged with an upper edge (40) of an item (3), when said item is inserted into the carrying device (1).

2. The carrying device according to claim 1, wherein the lip (13) points in a direction toward the second stop (11, 14, 37b) behind the rubber elastic portion of the retaining means (5).

3. The carrying device according to claim 1, wherein a width of the carrying means (6) from the front of the carrying means (6) is less than 20 mm, measured from the stop (11, 14, 37) behind the rubber elastic portion of the carrying means (6).

4. The carrying device according to claim 3, wherein the width of the carrying means from the front of the carrying means is 5–15 mm, measured from the stop behind the carrying means.

5. The carrying device according to claim 4, wherein the width of the carrying means from the front of said carrying means is about 10 mm, measured from the stop behind said carrying means.

6. The carrying device according to claim 1, wherein a distance of the lip is less than 15 mm, as measured from the stop behind the rubber-elastic portion of the retaining means to the lip of rubber-elastic portion.

7. The carrying device according to claim 6, wherein the distance of the lip is less than 10 mm measured from the stop behind the rubber-elastic portion of the retaining means to the lip of the rubber-elastic portion.

8. The carrying device according to claim 1, wherein the distance of the lip is about 5 mm measured from the stop behind the rubber-elastic portion of the retaining means to the lip of the rubber-elastic portion.

9. The carrying device according to claim 1 having a shelf protruding from the front of the carrying means arranged horizontally and vertically below the upper surface thereof.

10. The carrying device according to claim 9, wherein said shelf has steps extending in the crosswise direction.

11. The carrying device according to claim 10, wherein the steps are saw-tooth shaped with a low, steep or essentially vertical edge facing the stop of the carrying means.

12. The carrying device according to claim 11, wherein peaks of serrations of said saw-tooth shaped steps are positioned in a horizontal plane which is 0.2–1 mm below a plane of the supporting surface of the carrying means.

13. The carrying device according to claim 12, wherein the peaks of serrations of said saw-tooth shaped steps are positioned in a horizontal plane which is about 0.5 mm below the plane of the supporting surface of the carrying means.

14. The carrying device according to claim 1, wherein the retaining means and carrying means are connected by an essentially vertical wall which defines the first and second stops.

15. The carrying device according to claim 1, wherein the retaining means on a front thereof has a holder to hold signs and labels.

16. The carrying device according to claim 15, wherein the holder to hold signs and labels is an open channel in the front of the retaining means.

17. The carrying device according to claim 1, wherein the carrying means on a front thereof has a holder to hold signs and labels.

18. The carrying device according to claim 17, wherein the holder to hold signs and labels is an open channel in the front of the carrying means.

19. The carrying device according to claim 1, wherein suspension means (12) for suspension of the device on a wall is provided at the top on the back of the device.

20. The carrying device according to claim 19, wherein supporting means (25, 33) for support against a wall on which the carrying device is suspended is provided on the back of the device below the suspension means (12).

21. The carrying device according to claim 20, wherein the supporting means (33) is adjustable lengthwise.

22. The carrying device according to claim 21, wherein the supporting means are formed from pieces of an extruded rubber blank which in the crosswise direction is provided with longitudinal weakenings to permit a shortening of said rubber blank.

23. The carrying device according to claim 19, wherein catching means (19) intended for carrying an additional carrying device below the carrying device by suspension means on said additional carrying device, are provided at a lower part of said device.

24. The carrying device according to claim 23, wherein said catching means on said carrying device and said suspension means on said additional carrying device are adapted to be locked together, when said additional carrying device is suspended by the suspension means from said catching means of said carrying device.

25. The carrying device according to claim 24, wherein an interlocking arrangement is provided by a recess (53, 54) in both the suspension means and the catching means forming together a channel when assembled, in which channel a stiff wire (52) is inserted thus locking the suspension means and the catching means together.

26. The carrying device according to claim 1 wherein legs or feet (8, 30, 9, 28) for resting on a substantially horizontal support face are provided on the lowermost part of the device.

27. The carrying device according to claim 1, wherein said carrying device is of a form which is elongate in the crosswise direction and has an essentially constant cross section.

28. The carrying device, according to claim 27, wherein the carrying device has a supporting structure comprising a supporting chassis (11), a retaining means (5), a carrying means (6), and a shelf (7) extruded from an elongate metal blank.

* * * * *